Aug. 20, 1940.  C. Z. MONROE  2,212,449
MECHANISM FOR SEALING CONTAINERS
Filed Sept. 20, 1937    2 Sheets-Sheet 1
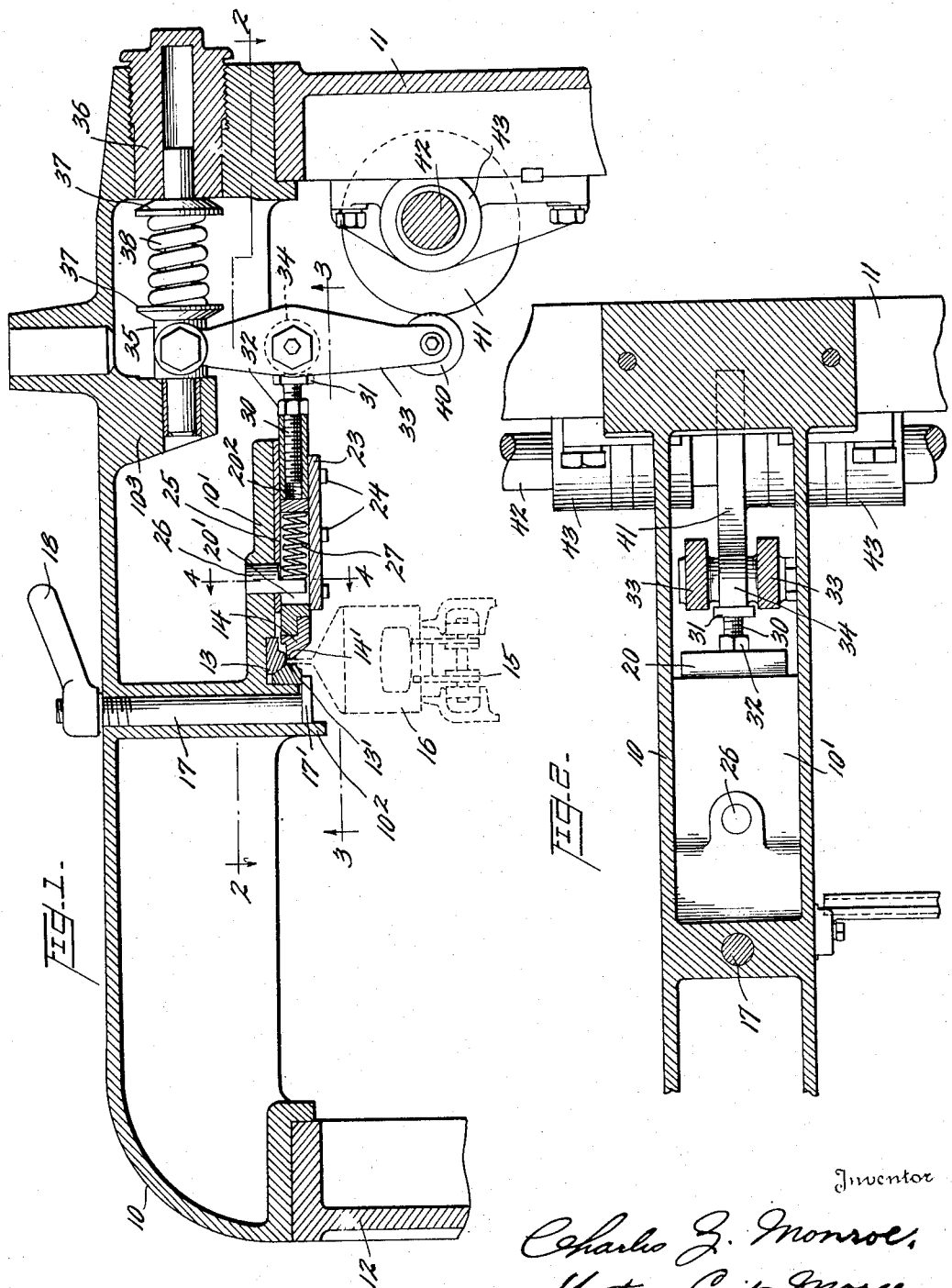

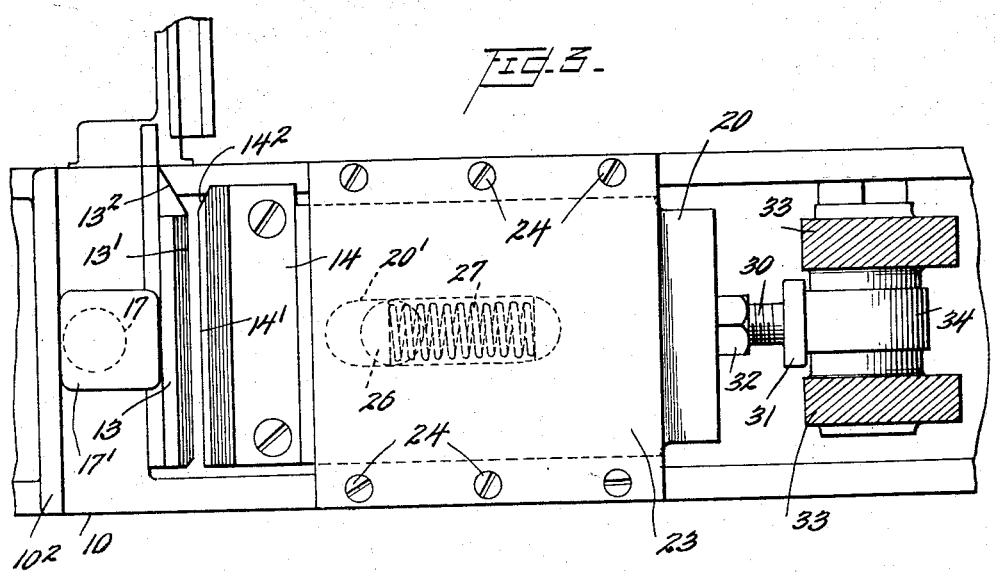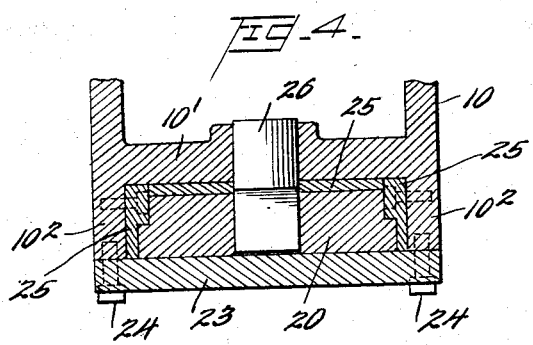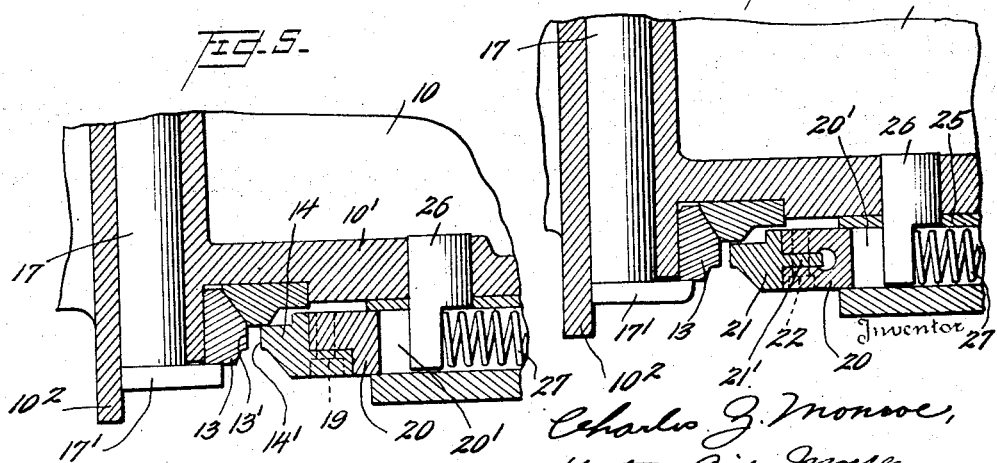

Patented Aug. 20, 1940

2,212,449

UNITED STATES PATENT OFFICE 2,212,449

MECHANISM FOR SEALING CONTAINERS

Charles Z. Monroe, Detroit, Mich., assignor to The American Paper Bottle Company, Toledo, Ohio, a corporation of Ohio Application September 20, 1937, Serial No. 164,784

1 Claim. (Cl. 226—56)

The present invention relates to mechanism for sealing containers and particularly to a mechanism for sealing containers of the type disclosed in Patent No. 2,047,891, granted July 14, 1936, to Henry T. Scott.

The container which comprises the subject matter of the aforementioned patent is fabricated of paper and comprises essentially a tubular body portion and an end closure which terminatess in a rib which includes a plurality of panels disposed in parallel planes. In the process of manufacture the container is coated exteriorly and interiorly with a leak-proofing substance such as paraffin or a paraffin containing composition and, after the container has been charged, for instance with milk or other liquid, the end closure folded and the closure rib completely formed, it is desirable that the rib be subjected to heavy pressure between the opposed jaws of a sealing mechanism in order that the various plies or panels comprising the closure rib may be closely pressed together and the coating substance caused to flow and to occupy any and all spaces intermediate the several panels of the rib which might otherwise serve as ducts or passages for the escape of liquid from the container. A mechanism designed and intended for the accomplishment of this object is disclosed in Patent 2,082,722, issued to Henry T. Scott June 1, 1937 and the present invention comprises an improvement upon the mechanism disclosed in that patent.

In the previously patented sealing mechanism means is provided for introducing the rib of a container of the type previously mentioned intermediate spaced relatively movable jaws and the mechanism for causing the jaws to approach each other to depress the container rib includes a device for effecting a preliminary and relatively rapid movement of one of the jaws toward the container rib and a second device for effecting a final and relatively slow advancing movement of the rib engaging jaw, applying a heavy pressure to the rib. The object of the present invention is to provide an improved, simplified and more effective mechanism for accomplishing the same general object. In accordance with the instant invention, improved jaw carrying means is provided, both for the movable jaw and the stationary jaw.

The stationary jaw is so supported that it may be quickly and easily removed and replaced, while at the same time firmly retained in operative position after having been so placed. This retaining mechanism is of advantage, especially where it is desired that one of the jaws may also partake of the nature of a stamping die, for instance being lettered to indicate the date upon which the sealing operation occurred. In such case the jaw will be removed daily, or even at more frequent intervals, and replaced by another bearing a different legend so that the ability to effect ready removal of one jaw and substitution of another is of substantial advantage. The mechanism for supporting and operating the movable jaw is also substantially improved in order that a quicker and more positive action may be obtained. Likewise the mechanism including a safety device of novel character which automatically operates to prevent over-strain or breakage of the operating parts whenever the advancing jaw meets with unexpected resistance, as for instance where it comes into contact with an unusually thick or otherwise defective container rib. The various features of the invention will be hereinafter more fully pointed out. It will be appreciated by one skilled in the art that the pressure applying or jaw advancing mechanism may be duplicated, if desired, so that the mechanism as a whole includes two movable jaws instead of one movable jaw and a stationary jaw, should this be desired, likewise that a number of the component elements of the invention may be changed in design and arrangement in adapting the same to mechanisms of different types intended for the sealing of other kinds of container ribs or the like.

One embodiment of the invention, selected for disclosure by way of example, is illustrated in the accompanying drawings, in which:

Figure 1 is a longitudinal section through the frame of the mechanism, showing certain of the operating parts in section and others in side elevation;

Figure 2 is a section on line 2—2 of Figure 1;

Figure 3 is a section on line 3—3 of Figure 1;

Figure 4 is a section on line 4—4 of Figure 1;

Figure 5 is a transverse section through the pressure applying jaws and mechanism immediately associated therewith, upon a somewhat larger scale than that of Figure 1; and Figure 6 is a similar view but which shows a modified type of moving support for the movable jaw.

The mechanism shown may advantageously be used in conjunction with, or as an element of, a complete automatic container fabricating, coating, charging and sealing apparatus but, if desired, may be used as an entirely independent unit. The supporting frame of the mechanism may be formed as found most convenient but when it is intended that the mechanism shall comprise one unit of the complete automatic machine the frame is preferably formed as shown in the drawings, comprising essentially a hollow horizontally disposed bridging member 10, the ends of which are supported, respectively, upon, and secured to, the side frame members 11 and 12 of the complete machine. The container rib engaging jaws are indicated at 13 and 14 respectively, in this instance the jaw 13 being the stationary jaw and the jaw 14 the movable jaw. The jaws are provided with elongated vertically disposed and parallel container rib engaging surfaces 13' and 14' respectively and at the ends thereof toward which the container ribs are first moved, are provided with inclined or bevelled surfaces 13² and 14² in order that there may be no possible interference between the jaws and the end of a container rib advanced horizontally into position to be acted upon thereby. Directly beneath the space between the jaws 13 and 14 is a conveyor, generally indicated at 15, and the details of which may be varied as desired, it being the function of the conveyor to advance containers with a step-by-step movement so that they are successively moved into position beneath the pressure applying jaws, each with the rib thereof directly interposed between the pressure applying surfaces 13' and 14' of such jaws. One of the containers is illustrated in chain lines in Figure 1 and is indicated by the reference numeral 16. The stationary jaw 13 rests against a flat supporting surface of the frame and is maintained in the position in which it is shown in the drawings by a manually operable locking device which comprises the vertically extending rod 17, slidably retained within a cylindrical aperture formed in the frame and having at its lower end a horizontally extending portion 17'. A rotatable handle 18 is threaded upon the upper end of rod 17 and by means of this handle the rod may be raised or lowered, the rod being prevented from rotating by reason of the sliding engagement of an edge of the rectangular projection 17' with the adjacent flat surface of rib 10² of bridging member 10. When rod 17 and projection 17' are lowered the jaw 13, which rests on projection 17', is released and may be removed and replaced.

The movable jaw 14 may be formed, in cross-section, as shown in Figure 5 and may be secured to the forward end of a slide 20 by means of screws 19 or other attachment devices. Both jaws are preferably fabricated of hardened metal. In Figure 6 the movable jaw 21 is shown to have a horizontally projecting tongue 21' which fits closely within a slot formed in the forward edge of the slide 20 and is preferably secured in position by screws 22. In either case the movable jaw may be detached from its slide after removal of the securing screws.

The supporting slide 20 is in the form of a flat plate which is retained within a horizontally extending slideway defined by the horizontal web 10' of the frame, the parallel downwardly projecting flanges 10² thereof and the bottom or cover plate 23 secured to flanges 10² by means of screws 24. Flat lining plates of anti-friction metal are indicated at 25. The slide 20 is longitudinally slotted, the slot being indicated at 20' and into this slot projects the flattened lower end of a stud 26 the upper portion of which is secured within a suitable recess in the horizontal web 10' of the frame. Housed within the slot 20' and having one end bearing against the end of this slot and its other end bearing against stud 26 is a coiled compression spring 27 which constantly acts to project the slide to the right (Figure 1) or in a direction to move the movable jaw 14 to its inoperative position. The end of the slide remote from the jaw 14 is provided with an axially extending threaded aperture 20² within which is located the threaded bolt 30. The outer end of this bolt has integral therewith a head 31 and a lock nut 32 is provided for the purpose of preventing rotation of the bolt. It is clear that, when lock nut 32 is loosened, the bolt may be freely rotated and hence the distance of its head 31 from slide 20 adjusted as desired. Through the bolt 30, by means which bears against the bolt head 31, forces may be applied to the slide 20 to advance the jaw 14 to operative position against the action of spring 27 and, when such forces are removed, spring 27 will function to draw the movable jaw 14 away from its operative position.

The slide operating means comprises essentially a substantially vertically extending lever 33, provided with a roller 34 at approximately its midpoint which roller rests against the head 31 of bolt 30. At its upper end the lever, which is preferably of the bifurcated type, is pivotally connected to an enlarged intermediate portion of a rod member 35, one end of which is slidably retained within a horizontally extending cylindrical aperture formed in frame portion 10³ and the other end of which is slidably retained within an axial cylindrical aperture formed in a plug or bushing 36 which plug is in turn received within a corresponding aperture in the frame 10 and has threaded engagement with the frame in order that, by rotation of the plug, it may be adjusted axially. Positioned upon rod 35 are spring abutments 37, in the nature of collars or washers, one spring abutment resting against the adjustable plug 36 and the other against the enlarged portion of rod 35 to which the upper end of the lever is pivotally connected. Intermediate these collars or spring abutments is a relatively stiff helical spring 38, normally under compression and therefore tending to maintain the enlargement of rod 35 firmly pressed against portion 10³ of the frame and hence to maintain the pivotal axis or fulcrum of lever 33 in a constant position.

At its lower end the lever 33 is provided with a roller 40 which bears against the periphery of a cam 41 fixed upon a shaft 42 rotatably mounted in bearings such as 43 secured to the frame member 11. Rotation of cam 41 effects movement of the lower end of lever 33 toward and away from the axis of the drive shaft 42 and the extent of this movement is of course dependent upon the configuration of the cam. The cam is therefore so designed as to effect the desired travel of the slide 20 together with the movable jaw 14 which is attached thereto. The cam is so shaped that the slide is given a preliminary rapid movement toward a container rib which is positioned to be acted upon, which preliminary rapid movement is followed by a relatively slow final movement as the face of the movable jaw comes into contact with the container rib so that the container rib is subjected to a heavy pressure during a short travel of the jaw. By adjusting the position of bolt 30, as previously explained, the limit of movement of the movable jaw with respect to the stationary jaw may be varied as desired and hence the mechanism adjusted so that the desired pressure can be applied to the ribs of containers which vary in thickness.

The rotation of drive shaft 42 is synchronized with the movements of the conveyor 15 so that each container as it is successively positioned with its closure rib intermediate jaws 13 and 14 will be subjected to a heavy pressure or squeezing action and thereafter released, after which the container just operated on is withdrawn and the rib of a following container inserted between the jaws. This action continues so long as the parts remain in operation and is entirely automatic. It sometimes happens that a container rib is not perfectly formed when inserted between the pressure jaws and may be so thick that, if no safety device were employed, the various operating parts of the mechanism would be over-strained and possibly broken. The spring 38 functions as a safety release device, being adapted to yield when a greater than normal resistance is met with by the movable jaw 14 and to permit the rod 35 to move to the right (Figure 1), carrying with it the fulcrum point of lever 33 thus preventing the mechanism from becoming excessively strained or broken. By adjusting the plug 36, the initial compression of the spring 38 may be regulated.

Having thus described the invention, what is claimed as new and desired to be secured by Letters Patent is:

In a mechanism for successively sealing paper containers, the combination with means for advancing containers along a predetermined path with a step-by-step motion in a generally horizontal direction, of a support extending over said means, a jaw carrier slidably mounted on the underside of said support for movement transversely of the path of movement of the containers, resilient means interposed between said support and said jaw carrier and normally urging said carrier away from work engaging position, an element mounted in said support above the jaw carrier for horizontal sliding movement in a direction parallel to that of the jaw carrier, movement of said member in the same direction as the jaw carrier when on its working stroke being limited by a stop which is fixed with respect to said support, resilient means for normally maintaining said member in contact with said stop but permitting the same to move away from the stop upon the application thereto of a force of predetermined magnitude, a lever having one end pivotally secured to said member and depending vertically therefrom, a cam device for acting upon the lower end of said lever for intermittently and positively swinging such lower end through a predetermined arc toward said conveyor advancing means, and means mounted on said lever substantially midway of its ends for contacting the jaw carrying slide and communicating the movements of the lever toward the conveyor to said slide.

CHARLES Z. MONROE.